United States Patent Office 2,911,449
Patented Nov. 3, 1959

2,911,449

STABILIZATION OF CHLORINATED HYDROCARBONS WITH A SYNERGISTIC COMBINATION OF A TERTIARY ACETYLENIC MONOHYDRIC ALCOHOL AND CERTAIN PHENOLIC COMPOUNDS

Charles O. Herman, Nixon, and William F. Lehr, Middlesex, N.J., assignors to Air Reduction Company, Incorporated, New York, N.Y., a corporation of New York No Drawing. Application February 8, 1956
Serial No. 564,117

8 Claims. (Cl. 260—652.5)

This invention relates to the stabilization of chlorinated hydrocarbons. More particularly, it relates to the stabilization of chlorinated hydrocarbon solvents against degradation when exposed to heat, light, and air; and it comprises a method of effecting such stabilization.

The term "stabilization," in its various forms, as used in this specification and the appended claims, is intended to refer to the inhibition of the decomposition reaction and/or the alleviation of the deleterious effects of decomposition products.

The chlorinated hydrocarbons are widely used, among other things, as solvents in greasing metallic articles, extracting caffein from coffee and in dry cleaning. The principal shortcoming of chlorinated hydrocarbons is their tendency to decompose when exposed to heat, light, and air with the formation of products, usually acidic in nature, having objectionable properties. The presence of even small amounts of such acid substances cannot be tolerated since the solvents normally come into contact with metallic articles. Furthermore, the acid substances are detrimental to fabrics and to many dyes. While many chemical additives have been suggested for incorporation in chlorinated solvents to inhibit their decomposition or to react with or neutralize the objectionable substances formed by the degradation of such solvents, there is a need for improvement in the ability of these chemical additives or stabilizers to prevent the degradation of chlorinated-hydrocarbon solvents.

It is an object of the present invention to provide a chlorinated hydrocarbon solvent having improved stability. An additional object is to provide a mixture of stabilizing materials which will exert a synergistic effect one with the other so that chlorinated hydrocarbon solvents are more effectively stabilized with the mixture than with either stabilizing material alone. A further object is to provide an improved process for stabilizing chlorinated hydrocarbons. Other objects will, in part, appear in, and in part be obvious from, the following detailed description.

An important contribution in the field of stabilization of chlorinated hydrocarbon solvents has been the discovery that tertiary acetylenic monohydric alcohols may be used as stabilizers. The tertiary acetylenic monohydric alcohols which have been found effective may be represented by the formula:

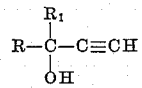

wherein R is an alkyl group containing from 1 through 6 carbon atoms and $R_1$ may be an alkyl, aryl, alkaryl, or cycloalkyl radical. The following compounds are representative of those encompassed by the foregoing formula:

2-methyl-3-butyn-2-ol
3-methyl-1-pentyl-3-ol
3-methyl-1-nonyn-3-ol
3,5-dimethyl-1-hexyn-3-ol
2-phenyl-3-butyn-2-ol The use of these compounds as stabilizers for chlorinated hydrocarbon solvents is more fully described and disclosed in the copending application of Warren C. Ellis, Jr. and Morton W. Leeds, Serial No. 408,978, filed on February 8, 1954. Due to the wide variety of uses and conditions to which the chlorinated hydrocarbon solvents are put, it has been found desirable, in many cases, to supplement the stabilizing activity of the tertiary monohydric acetylenic alcohols with an additional material or materials.

According to the present invention, it has now been discovered that a mixture of such a tertiary acetylenic monohydric alcohol and a phenolic compound selected from the group consisting of resorcinol, p-tert-amyl phenol, mono-tert-butyl m-cresol, and 5,5,8,8-tetramethyl-5,6,7,8-tetrahydro-2-naphthol is unusually effective in stabilizing chlorinated hydrocarbons. This combination of materials exerts a stabilizing effect upon chlorinated hydrocarbons which is greater than additive with respect to the effect exerted by its components separately. Furthermore, chlorinated hydrocarbons stabilized with this combination of materials may be used for a wider variety of uses and under more extreme conditions without fear of the formation of objectionable amounts of acid products. In addition, it has been found that this combination of stabilizers unexpectedly exerts an anti-corrosive effect when the solvent is employed for the vapor phase degreasing of metallic articles. While many phenolic substances have heretofore been suggested as stabilizers for chlorinated hydrocarbons, only a select number of phenolic materials have been found to exert a synergistic effect with tertiary acetylenic monohydric alcohols.

We have found that this unexpected synergistic stabilizing activity may be obtained with a combination of any of the phenolic compounds included within the group consisting of resorcinol, p-tert-amyl phenol, mono-tert-butyl-n-cresol, and 5,5,8,8-tetramethyl-5,6,7,8-tetrahydro-2-naphthol with any of the tertiary acetylenic monohydric alcohols represented by the formula

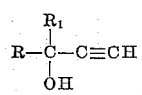

wherein R and $R_1$ have the meaning given above. Combinations of such a phenolic compound with 2-methyl-3-butyn-2-ol or 3-methyl-1-pentyn-3-ol have been found to be particularly effective in stabilizing chlorohydrocarbons.

While the amount of stabilizer mixture added to the chlorohydrocarbon solvent will depend upon the particular solvent to be stabilized, the intended use of the solvent composition and the degree of stability desired, generally, the mount of the mixture of tertiary acetylenic monohydric alcohol and phenolic substance added to the chlorinated solvent may range from as low as about 0.01 percent by weight to about 1.0 percent by weight. Any suitable proportion of tertiary acetylenic monohydric alcohol to phenolic material may be used, however, a range of from 1:3 to 3:1 has been found to be especially suitable.

When operating in accordance with this invention, the two stabilizing materials may simply be mixed together to form a composition adapted to be subsequently added to, or admixed with, the chlorinated hydrocarbon solvent to be stabilized, or each of the stabilizer materials may be individually added to, or admixed with, the chlorohydrocarbon solvent. For certain applications of the chlorinated hydrocarbon solvents, it may be desirable to add other stabilizing agents, such as alkaline reacting materials and unsaturated materials, e.g. diisobutylene.

While the combination of a tertiary acetylenic monohydric alcohol and a phenolic material has been found to be particularly effective for the stabilization of trichloroethylene and perchloroethylene, the mixture may also be used to stabilize other chlorohydrocarbons such as methylene chloride, ethylene dichloride, trichloroethane, methyl chloroform, vinylidine chloride, vinyl chloride, and the like.

The following examples will illustrate the unexpected stabilizing effects obtainable by employing a combination of a certain selected phenolic material and a tertiary acetylenic monohydric alcohol as the stabilizer system. In each example, the indicated stabilizer system was added, and the amounts indicated, to 500 grams of an industrial grade of trichloroethylene containing ½ ml. of water. A strip measuring about 1½" x ½" of each of aluminum foil, galvanized iron, and mild steel was suspended in the vapor phase of the refluxing solvent, and similar strips were added to the liquid phase of the solvent. After refluxing the solvent for the period indicated in the examples, the metal strips were visually examined for corrosion. The concentrations given in the examples are percent by weight.

Example 1

Stabilizer system: 0.3% 3-methyl-1-pentyn-3-ol.
Reflux time: 48 hours.
Observations: In the liquid phase: the aluminum strip was discolored and brittle; the mild steel strip was completely colored with rust; and the galvanized iron strip was black in color. In the vapor phase: the aluminum strip showed two colored streaks and one colored spot about the size of a pinhead; the steel strip was badly rusted but somewhat superior to the steel in the liquid phase, and the galvanized iron strip was corroded.

Example 2

Stabilizer system:
  0.1% resorcinol
  0.3% 3-methyl-1-pentyn-3-ol.
Reflux time: 106.5 hours.
Observations: In the liquid phase: the steel strip had a red deposit over a small area where it had come into contact with the galvanized iron strip; the galvanized iron strip had only a slight but uniform pink discoloration; the aluminum strip showed no signs of corrosion. In the vapor phase: the aluminum and galvanized iron strips were virtually untouched; the steel strip showed only a small resin-like deposit at the point from which it was suspended.

Example 3

Stabilizer system:
  0.1% p-tert-amyl phenol.
  0.3% 3-methyl-1-pentyn-3-ol.
Reflux time: 168 hours.
Observations: No signs of solvent degradation or metal corrosion were noted.

Example 4

Stabilizer system:
  0.1% mono-tert-butyl-m-cresol.
  0.3% 3-methyl-1-pentyn-3-ol.
Reflux time: 210 hours.
Observations: The solvent had turned slightly yellow, but there was no evidence of any metal corrosion.

Example 5

Stabilizer system:
  0.1% 5,5,8,5-tetramethyl-5,6,7,8-tetrahydro-2-naphthol.
  0.3% 3-methyl-1-pentyn-3-ol.
Reflux time: 210 hours.
Observations: The solvent mixture had retained its original color and no signs of metal corrosion were noted.

The unusual and surprising decrease in metal corrosion obtained with the combination of a phenolic compound and tertiary acetylenic monohydric alcohol is believed to demonstrate the superior ability of the mixture to control the formation of acid products.

Since many different embodiments of this invention may be made without departing from the spirit and scope thereof, it is to be understood that the invention should not be limited except as defined in the appended claims.

What is claimed is:

1. A composition of matter comprising a chlorinated hydrocarbon solvent and a small but stabilizing amount of a mixture of 3-methyl-1-pentyn-3-ol and a phenolic compound selected from the group consisting of resorcinol, p-tert-amyl phenol, mono-tert-butyl-m-cresol, and 5,5,8,8-tetramethryl-5,6,7,8-tetrahydro-2-naphthol.

2. Composition according to claim 1 wherein said chlorinated hydrocarbon solvent is trichloroethylene.

3. Composition according to claim 1 wherein said chlorinated hydrocarbon solvent is perchloroethylene.

4. A composition of matter comprising a chlorinated hydrocarbon solvent and between about 0.01 to about 1.0 percent by weight of a mixture of 3-methyl-1-pentyn-3-ol and a phenolic compound selected from the group consisting of resorcinol, p-tert-amyl phenol, mono-tert-butyl-m-cresol, and 5,5,8,8-tetramethyl-5,6,7,8-tetrahydro-2-naphthol.

5. A composition of matter as defined in claim 1 wherein said phenolic compound is resorcinal.

6. A composition of matter as defined in claim 1 wherein said phenolic compound is p-tert-amyl phenol.

7. A composition of matter as defined in claim 1 wherein said phenolic compound is mono-tert-butyl-m-cresol.

8. A composition of matter as defined in claim 1 wherein said phenolic compound is 5,5,8,8-tetramethyl-5,6,7,8-tetrahydro-2-naphthol.

References Cited in the file of this patent

UNITED STATES PATENTS

| | | |
|---|---|---|
| 2,008,680 | Carlisle et al. | July 23, 1935 |
| 2,155,723 | Levine et al. | Apr. 25, 1939 |
| 2,603,622 | Berger et al. | July 15, 1952 |